(12) United States Patent
Li

(10) Patent No.: US 11,704,054 B1
(45) Date of Patent: Jul. 18, 2023

(54) METHOD AND APPARATUS FOR PERFORMING ACCESS MANAGEMENT OF MEMORY DEVICE WITH AID OF BUFFER USAGE REDUCTION CONTROL

(71) Applicant: Silicon Motion, Inc., Hsinchu County (TW)

(72) Inventor: An-Pang Li, New Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 44 days.

(21) Appl. No.: 17/569,451

(22) Filed: Jan. 5, 2022

(51) Int. Cl.
*G06F 3/06* (2006.01)
*G06F 12/02* (2006.01)

(52) U.S. Cl.
CPC .......... *G06F 3/0656* (2013.01); *G06F 3/0604* (2013.01); *G06F 3/0622* (2013.01); *G06F 3/0659* (2013.01); *G06F 3/0679* (2013.01); *G06F 12/0246* (2013.01); *G06F 2212/72* (2013.01)

(58) Field of Classification Search
CPC .... G06F 3/0656; G06F 3/0604; G06F 3/0622; G06F 3/0659; G06F 3/0679; G06F 12/0246; G06F 2212/72
See application file for complete search history.

(56) References Cited

U.S. PATENT DOCUMENTS

2019/0369892 A1   12/2019   Huang
2020/0393973 A1   12/2020   Reusswig

FOREIGN PATENT DOCUMENTS

CN   112445421 A   3/2021
TW   201510855 A   3/2015

*Primary Examiner* — Nanci N Wong
(74) *Attorney, Agent, or Firm* — Winston Hsu

(57) ABSTRACT

A method for performing access management of a memory device with aid of buffer usage reduction control and associated apparatus are provided. The method includes: determining whether any host command among a plurality of host commands from a host device is a trim-related read command, wherein the trim-related read command represents a read command indicating that reading from at least one trimmed location is required; in response to the any host command being the trim-related read command, determining an estimated trim-related read operation count regarding a data buffer according to a trimmed range of the at least one trimmed location and a predetermined unit size of accessing the data buffer; writing predetermined trimmed data having the predetermined unit size into the data buffer; and controlling a transmission interface circuit to read the predetermined trimmed data from the data buffer multiple times, for being returned to the host device.

13 Claims, 9 Drawing Sheets

METHOD AND APPARATUS FOR PERFORMING ACCESS MANAGEMENT OF MEMORY DEVICE WITH AID OF BUFFER USAGE REDUCTION CONTROL

BACKGROUND OF THE INVENTION

1. Field of the Invention

The present invention is related to memory control, and more particularly, to a method for performing access management of a memory device with aid of buffer usage reduction control, and associated apparatus such as the memory device, a memory controller thereof, etc.

2. Description of the Prior Art

Developments in memory technology have enabled the wide application of various portable or non-portable memory devices, such as memory cards respectively conforming to the SD/MMC, CF, MS and XD specifications, and embedded memory devices respectively conforming to the UFS and eMMC specifications. Improving access control of these memory devices remains an issue to be solved in the art.

NAND flash memories may comprise single level cell (SLC) and multiple level cell (MLC) flash memories. In an SLC flash memory, each transistor used as a memory cell may store either of two electrical charge values respectively corresponding to logic values 0 and 1. In comparison, the storage ability of each transistor used as a memory cell in an MLC flash memory may be fully utilized. The transistor in the MLC flash memory can be driven by a voltage higher than that in the SLC flash memory, and different voltage levels can be utilized to record information of at least two bits (e.g., 00, 01, 11, or 10). In theory, the recording density of the MLC flash memory may reach at least twice the recording density of the SLC flash memory, and is therefore preferred by manufacturers of NAND flash memories.

The lower cost and larger capacity of the MLC flash memory means it is more likely to be applied in memory devices than an SLC flash memory. The MLC flash memory does have instability issues, however. To ensure that access control of the flash memory in the memory device meets required specifications, a controller of the flash memory may be equipped with some management mechanisms for properly managing data access.

Even memory devices with the above management mechanisms may have certain deficiencies, however. For example, a host device may send a trim command to a memory device to trigger trim processing in the memory device, and may further check whether the trim processing is successful. As a result, the memory device may need to prepare a response for being returned to the host device, where the overall performance of the memory device may be reduced. In addition, as the above management mechanisms are complicated, changing the associated control should be performed carefully to prevent malfunction of the memory device.

Thus, there is a need for a novel method and associated architecture to solve the problems of the related art without introducing any side effect or in a way that is less likely to introduce side effects.

SUMMARY OF THE INVENTION

An objective of the present invention is to provide a method for performing access management of a memory device with aid of buffer usage reduction control, and to provide associated apparatus such as the memory device, a memory controller thereof, etc., to solve the problems mentioned above.

At least one embodiment of the present invention provides a method for performing access management of a memory device with aid of buffer usage reduction control, wherein the method is applied to a controller of the memory device. The memory device may comprise the controller and a non-volatile (NV) memory, and the NV memory may comprise at least one NV memory element (e.g., one or more NV memory elements). The method may comprise: determining whether any host command among a plurality of host commands from a host device is a trim-related read command, wherein the trim-related read command represents a read command indicating that reading from at least one trimmed location is required; in response to the any host command being the trim-related read command, determining an estimated trim-related read operation count regarding a data buffer within the controller according to a trimmed range of the at least one trimmed location and a predetermined unit size of accessing the data buffer; writing predetermined trimmed data having the predetermined unit size into the data buffer, wherein the predetermined trimmed data carries a predetermined data pattern; and controlling a transmission interface circuit within the controller to read the predetermined trimmed data from the data buffer multiple times, for being returned to the host device, wherein a time count of the multiple times is equal to the estimated trim-related read operation count.

In addition to the method mentioned above, the present invention also provides a memory device, and the memory device comprises an NV memory and a controller. The NV memory is configured to store information, wherein the NV memory may comprise at least one NV memory element (e.g., one or more NV memory elements). The controller is coupled to the NV memory, and the controller is configured to control operations of the memory device. In addition, the controller comprises a processing circuit, wherein the processing circuit is configured to control the controller according to a plurality of host commands from a host device, to allow the host device to access the NV memory through the controller. The controller further comprises a random access memory (RAM) and a transmission interface circuit, where the RAM is configured to provide the controller with internal storage space, and the transmission interface circuit is configured to perform communications with the host device according to a specific communications specification. For example, the controller determines whether any host command among the plurality of host commands from the host device is a trim-related read command, wherein the trim-related read command represents a read command indicating that reading from at least one trimmed location is required; in response to the any host command being the trim-related read command, the controller determines an estimated trim-related read operation count regarding a data buffer within the controller according to a trimmed range of the at least one trimmed location and a predetermined unit size of accessing the data buffer, wherein the data buffer is implemented with at least one storage region of the RAM; the controller writes predetermined trimmed data having the predetermined unit size into the data buffer, wherein the predetermined trimmed data carries a predetermined data pattern; and the controller controls the transmission interface circuit within the controller to read the predetermined trimmed data from the data buffer multiple times, for being returned to the host device, wherein a time count of the multiple times is equal to the estimated trim-related read operation count.

According to some embodiments, an associated electronic device is also provided. The electronic device may comprise the above memory device, and may further comprise: the host device, coupled to the memory device. The host device may comprise: at least one processor, arranged for controlling operations of the host device; and a power supply circuit, coupled to the at least one processor, arranged for providing power to the at least one processor and the memory device. In addition, the memory device may provide the host device with storage space.

In addition to the method mentioned above, the present invention also provides a controller of a memory device, wherein the memory device comprises the controller and an NV memory. The NV memory may comprise at least one NV memory element (e.g., one or more NV memory elements). In addition, the controller comprises a processing circuit, wherein the processing circuit is configured to control the controller according to a plurality of host commands from a host device, to allow the host device to access the NV memory through the controller. The controller further comprises a random access memory (RAM) and a transmission interface circuit, where the RAM is configured to provide the controller with internal storage space, and the transmission interface circuit is configured to perform communications with the host device according to a specific communications specification. For example, the controller determines whether any host command among the plurality of host commands from the host device is a trim-related read command, wherein the trim-related read command represents a read command indicating that reading from at least one trimmed location is required; in response to the any host command being the trim-related read command, the controller determines an estimated trim-related read operation count regarding a data buffer within the controller according to a trimmed range of the at least one trimmed location and a predetermined unit size of accessing the data buffer, wherein the data buffer is implemented with at least one storage region of the RAM; the controller writes predetermined trimmed data having the predetermined unit size into the data buffer, wherein the predetermined trimmed data carries a predetermined data pattern; and the controller controls the transmission interface circuit within the controller to read the predetermined trimmed data from the data buffer multiple times, for being returned to the host device, wherein a time count of the multiple times is equal to the estimated trim-related read operation count.

The method and the associated apparatus provided by the present invention can ensure that the memory device can properly operate under various situations, where examples of the apparatus mentioned above comprise: the controller, the memory device, etc. For example, with aid of the buffer usage reduction control, the method and the associated apparatus provided by the present invention can prepare the predetermined trimmed data in the data buffer for returning combined trimmed data (e.g., the predetermined trimmed data and at least one copy thereof) to the host device without causing any write conflict problem of the data buffer, and more particularly, can release the write bus of the data buffer for further use during accessing the NV memory in the memory device for the host device. In addition, the method and the associated apparatus provided by the present invention can ensure real-time response from the memory device to the host device, and therefore can improve the overall performance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
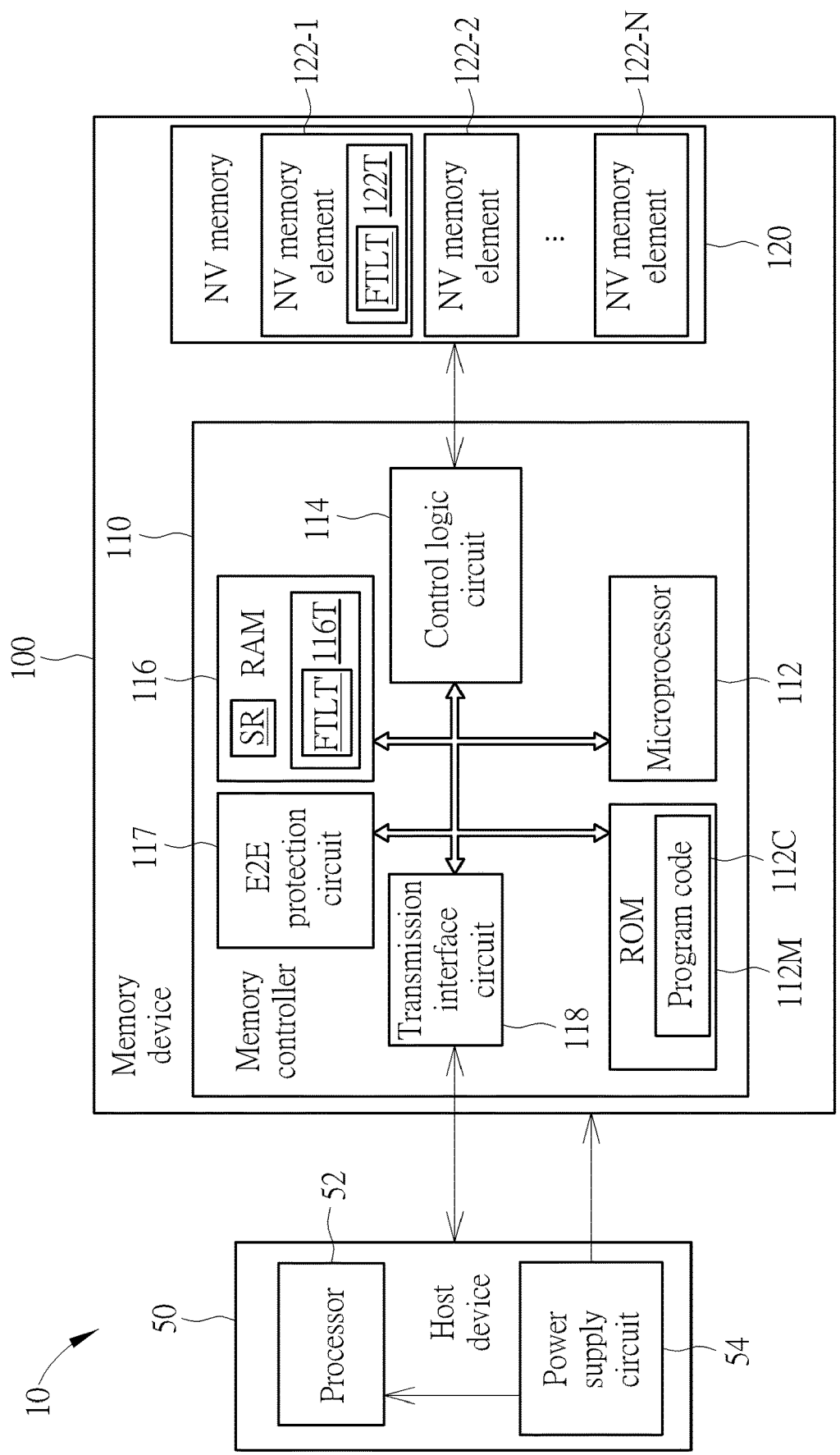
FIG. 1 is a diagram of an electronic device according to an embodiment of the present invention.

FIG. 1 is a diagram of an electronic device 10 according to an embodiment of the present invention, wherein the electronic device 10 may comprise a host device 50 and a memory device 100. The host device 50 may comprise at least one processor (e.g., one or more processors), which may be collectively referred to as a processor 52, and the host device 50 may further comprise a power supply circuit 54, coupled to the processor 52. The processor 52 is arranged to control operations of the host device 50, and the power supply circuit 54 is arranged to provide power to the processor 52 and the memory device 100, and output one or more driving voltages to the memory device 100. The memory device 100 can be arranged to provide the host device 50 with storage space, and the one or more driving voltages can be obtained from the host device 50 to be used as the power source of the memory device 100. Examples of the host device 50 may comprise (but are not limited to) multifunctional mobile phone, wearable device, tablet, and personal computer such as desktop computer and laptop computer. Examples of the memory device 100 may comprise (but are not limited to) portable memory devices (e.g., memory cards conforming to SD/MMC, CF, MS, or XD specification), solid state drives (SSD), and various embedded memory devices respectively conforming to UFS and EMMC specification. According to the embodiment, the memory device 100 may comprise a controller such as a memory controller 110, and may further comprise a non-volatile (NV) memory 120, wherein the controller is arranged to control operations of the memory device 100 and access the NV memory 120, and the NV memory 120 is arranged to store information. The NV memory 120 may comprise at least one NV memory element (e.g., one or more NV memory elements), such as a plurality of NV memory elements 122-1, 122-2, . . . and 122-N, wherein the symbol "N" can represent a positive integer greater than one. For example, the NV memory 120 may be a flash memory, and the plurality of NV memory elements 122-1, 122-2, . . . and 122-N may be a plurality of flash memory chips or a plurality of flash memory dies, but the invention is not limited thereto.

As shown in FIG. 1, the memory controller 110 may comprise a processing circuit such as a microprocessor 112, a storage unit such as a read-only memory (ROM) 112M, a control logic circuit 114, an end-to-end (E2E) protection circuit 117, a random access memory (RAM) 116, and a transmission interface circuit 118, wherein the above elements can be coupled to each other through a bus. The RAM 116 is implemented by a static random access memory (SRAM), but the invention is not limited thereto. The RAM 116 can be arranged to provide the memory controller 110 with internal storage space. For example, the RAM 116 can be used as a buffer memory to buffer data, and more particularly, may comprise at least one storage region (e.g., one or more storage regions), which may be collectively referred to as the storage region SR, for storing the buffered data, where a data buffer on at least one internal data path (e.g., one or more internal data paths) of the memory controller 110 can be implemented with the storage region SR of the RAM 116. In addition, the ROM 112M of the embodiment is arranged to store a program code 112C, and the microprocessor 112 is arranged to execute the program code 112C to control access to the NV memory 120. Please note that, in some examples, the program code 112C can be stored in the RAM 116 or any form of memory.

Under control of the microprocessor 112, the memory controller 110 can access the NV memory 120 for the host device 50, and can perform associated processing on a write data path or a read data path when there is a need. The write data path may start from the host device 50, pass through the transmission interface circuit 118, the E2E protection circuit 117, the data buffer implemented with the storage region SR of the RAM 116, and the control logic circuit 114, and reach the NV memory 120. The read data path may start from the NV memory 120, pass through the control logic circuit 114, the data buffer implemented with the storage region SR of the RAM 116, the E2E protection circuit 117, and the transmission interface circuit 118, and reach the host device 50. For example, the aforementioned at least one internal data path may comprise a partial write data path of the write data path (e.g., the partial write data path that starts from the transmission interface circuit 118, passes through the E2E protection circuit 117, the data buffer implemented with the storage region SR of the RAM 116, and the control logic circuit 114, and reaches the NV memory 120), and further comprise a partial read data path of the read data path (e.g., the partial read data path that starts from the NV memory 120, passes through the control logic circuit 114, the data buffer implemented with the storage region SR of the RAM 116, and the E2E protection circuit 117, and reaches the transmission interface circuit 118). In addition, a data protection circuit (not shown) in the control logic circuit 114 can protect data and/or perform error correction, the E2E protection circuit 117 can perform E2E protection on the partial write data path and the partial read data path, and the transmission interface circuit 118 can conform to a specific communications specification such as Serial Advanced Technology Attachment (SATA) specification, Universal Serial Bus (USB) specification, Peripheral Component Interconnect Express (PCIe) specification, Non-Volatile Memory Express (NVMe) specification, embedded Multi-Media Card (eMMC) specification, or Universal Flash Storage (UFS) specification, and can perform communications with the host device 50 according to the specific communications specification.

In the embodiment, the host device 50 can access the memory device 100 by sending host commands and corresponding logical addresses to the memory controller 110. The memory controller 110 receives the host commands and the logical addresses, and translates the host commands into memory operation commands (which may be simply called operation commands), and then controls the NV memory with the operation commands to perform reading, writing/programing, etc. on memory units (e.g., data pages) with physical addresses in the NV memory 120, wherein the physical addresses can be associated with the logical addresses. When the memory controller 110 performs an erase operation on any NV memory element 122-$n$ among the plurality of NV memory elements 122-1, 122-2, . . . and 122-N(the symbol "n" can represent any integer in the interval [1, N]), at least one of multiple blocks of the NV memory device 122-$n$ will be erased, wherein each block in the multiple blocks can comprise multiple pages (e.g., data pages), and an access operation (e.g., reading or writing) can be performed on one or more pages.

According to some embodiments, the processing circuit such as the microprocessor 112 can control the memory controller 110 according to a plurality of host commands from the host device 50, to allow the host device 50 to access the NV memory 120 through the memory controller 110. The memory controller 110 can store data into the NV memory 120 for the host device 50, read the stored data in response to a host command from the host device 50 (e.g., one of the plurality of host commands), and provide the host device 50 with the data read from the NV memory 120. In the NV memory 120 such as the flash memory, the aforementioned at least one NV memory element (e.g., the plurality of NV memory elements 122-1, 122-2, . . . and 122-N) may comprise a plurality of blocks such as a first set of physical blocks in the NV memory element 122-1, a second set of physical blocks in the NV memory element 122-2, . . . and an $N^{th}$ set of physical blocks in the NV memory element 122-N. The memory controller 110 can be designed to properly manage the plurality of blocks such as these sets of physical blocks.

The memory controller 110 can record, maintain, and/or update block management information regarding the block management in at least one table such as a table 116T and a table 122T, where the table 116T may comprise a temporary version of at least a portion (e.g., a part or all) of the table 122T. For example, the table 122T may comprise at least one logical-to-physical (L2P) address mapping table (e.g., one or more L2P address mapping tables), which may be collectively referred to as the L2P table FTLT, for recording mapping relationships between logical addresses and physical addresses, and the table 116T may comprise a temporary version of at least one sub-table (e.g., one or more sub-tables) of the L2P table FTLT, where the temporary version of the aforementioned at least one sub-table may be collectively referred to as the L2P table FTLT', but the invention is not limited thereto.

The memory controller 110 can back up the table 116T to the table 122T in the NV memory 120 (e.g., one or more NV memory elements in the plurality of NV memory elements 122-1, 122-2, . . . and 122-N), and the memory controller 110 may load at least a portion (e.g., a part or all) of the table 122T into the RAM 116 to become the table 116T for quick reference, where the table 122T can be illustrated in a certain NV memory element such as the NV memory element 122-1 to indicate that the table 122T can be stored in the NV memory element 122-1, but the invention is not limited thereto. According to some embodiments, the table 122T can be divided into multiple portions for being stored in two or more NV memory elements among the plurality of NV memory elements 122-1, 122-2, . . . and 122-N, and the table 122T can be illustrated as the multiple portions respectively stored in the two or more NV memory elements.

Figure 2:
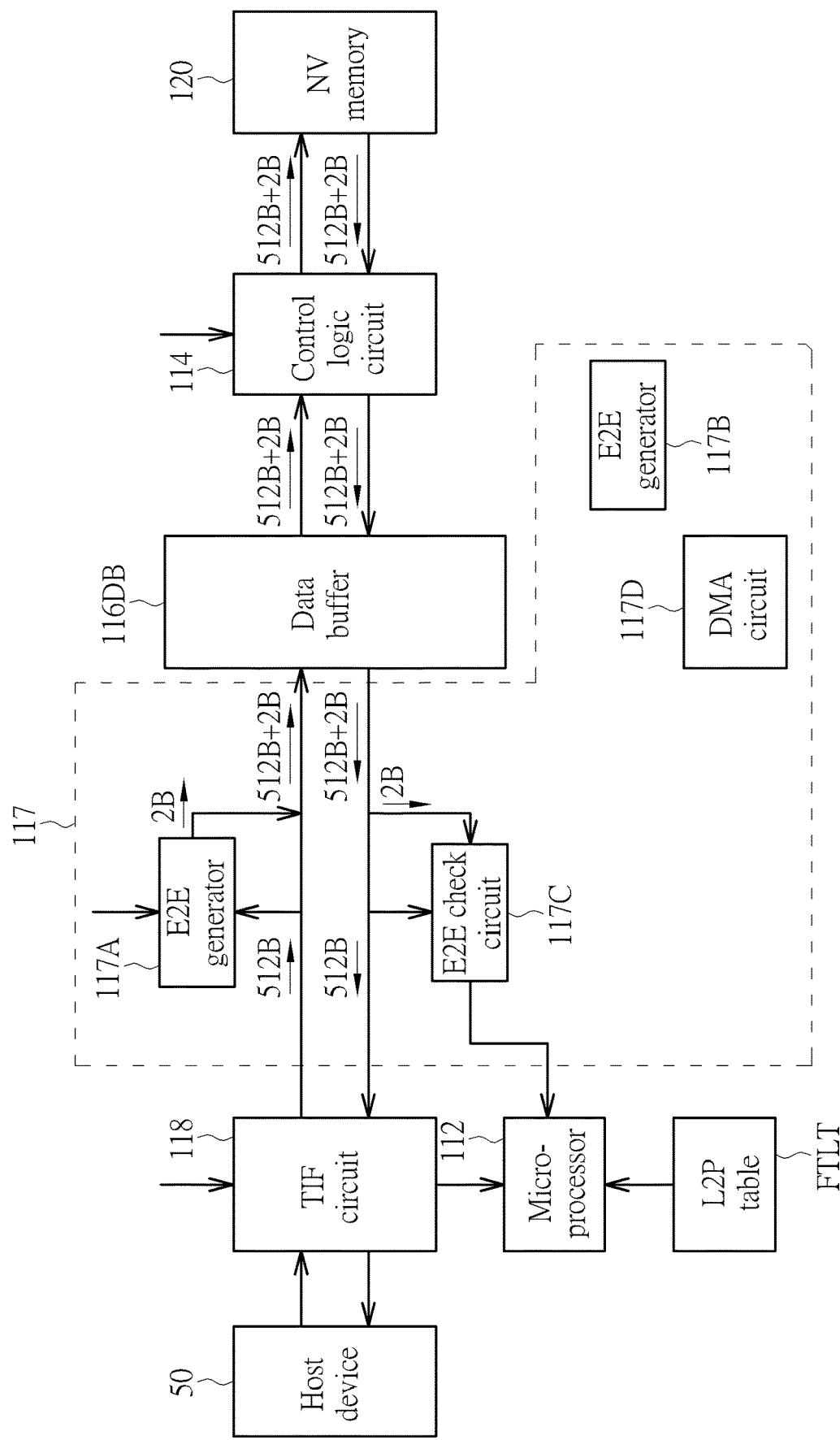
FIG. 2 is a diagram illustrating an internal protection architecture of the memory device shown in FIG. 1 according to an embodiment of the instant application.

FIG. 2 is a diagram illustrating an internal protection architecture of the memory device 100 shown in FIG. 1 according to an embodiment of the instant application. The E2E protection circuit 117 may comprise multiple subcircuits such as E2E generators 117A and 117B, an E2E check circuit 117C, a Direct Memory Access (DMA) circuit 117D, etc., but the invention is not limited thereto. For example, the hardware architecture of the E2E protection circuit 117 may vary. In addition, the data buffer 116DB shown in the upper half of FIG. 2 can be taken as an example of the aforementioned data buffer implemented with the storage region SR of the RAM 116 shown in FIG. 1. Additionally, the microprocessor 112 may be illustrated to access (e.g., read or update) the L2P table FTLT, but the invention is not limited thereto. As the microprocessor 112 is capable of loading the aforementioned at least one subtable (e.g., the one or more sub-tables) of the L2P table FTLT into the RAM 116 to be the L2P table FTLT', accessing (e.g., reading or updating) the L2P table FTLT', and updating the L2P table FTLT according to the L2P table FTLT', the microprocessor 112 may also be illustrated to access (e.g., read or update) the L2P table FTLT'.

Among the horizontal data paths shown in the upper half of FIG. 2, the write data path that starts from the host device 50, passes through the transmission interface (TIF) circuit 118 (labeled "TIF circuit" for brevity), the E2E protection circuit 117, the data buffer 116DB and the control logic circuit 114, and reaches the NV memory 120 can be taken as an example of the write data path mentioned above, and the read data path that starts from the NV memory 120, passes through the control logic circuit 114, the data buffer 116DB, the E2E protection circuit 117 and the transmission interface circuit 118, and reaches the host device 50 can be taken as an example of the read data path mentioned above, where the partial write data path and the partial read data path thereof (e.g., the partial write data path and the partial read data path between the transmission interface circuit 118 and the NV memory 120 as shown in the upper half of FIG. 2) can be taken as examples of the partial write data path and the partial read data path among the aforementioned at least one internal data path, respectively.

Regarding the E2E protection corresponding to the partial write data path, the data to be written into the memory device 100 (e.g., the NV memory 120) as requested by the host device 50 can be divided into multiple sectors. For example, any sector (e.g., each sector) among the multiple sectors may comprise 512 bytes (labeled "512B" for brevity), but the invention is not limited thereto. According to some embodiments, the size of the any sector (e.g., each sector) among the multiple sectors may vary. In addition, the E2E protection circuit 117 can utilize the E2E generator 117A to generate E2E protection information (e.g., a cyclic redundancy check (CRC) code) according to the any sector, and combine the any sector and the E2E protection information into a protected sector corresponding to the any sector and write the protected sector in the data buffer 116DB, for further processing on the partial write data path. For example, the E2E protection information (e.g., the CRC code) may comprise 2 bytes (labeled "2B" for brevity), and the protected sector may comprise (512+2) bytes (labeled "512B+2B" for brevity), but the invention is not limited thereto. According to some embodiments, the size of the any sector (e.g., each sector) among the multiple sectors and/or the size of the protected sector corresponding to the any sector may vary.

For better comprehension, the control logic circuit 114 can utilize the aforementioned data protection circuit (e.g., an error correction code (ECC) circuit) therein to perform data protection (e.g., ECC protection) on a set of protected sectors (e.g., the protected sectors corresponding to a set of sectors among the multiple sectors), and more particularly, can generate a parity code according to the set of protected sectors, and combine the set of protected sectors and the parity code into a protected access unit, and can further utilize a randomizer circuit (not shown) within the control logic circuit 114 to randomize the protected access unit to generate a randomized protected access unit (e.g., a randomized version of the protected access unit), for being programed into the NV memory 120, but the invention is not limited thereto. According to some embodiments, the processing of the control logic circuit 114 may vary. In addition, the control logic circuit 114 can read the randomized protected access unit that has been programed into the NV memory 120, in order to obtain a read version of the randomized protected access unit, such as the randomized protected access unit read from the NV memory 120. The control logic circuit 114 can utilize a de-randomizer circuit (not shown) therein to de-randomize the read version of the randomized protected access unit to obtain a read version of the protected access unit, and can further utilize the data protection circuit (e.g., the ECC circuit) to perform error detection on the read version of the protected access unit, and more particularly, for the case that any error is detected during the error detection, perform the error correction on the read version of the protected access unit, in order to recover the set of protected sectors, and therefore recover the protected sector corresponding to the any sector. In order to focus on some operations of the E2E protection circuit 117 in the internal protection architecture, both of the information transmitted from the control logic circuit 114 to the NV memory 120 on the partial write data path and the information transmitted from the NV memory 120 to the control logic circuit 114 on the partial read data path can be labeled "512B+2B" to indicate that any of the randomized protected access unit and the read version of the randomized protected access unit may carry the protected sector (e.g., (512+2) bytes) corresponding to the any sector (e.g., 512 bytes).

Regarding the E2E protection corresponding to the partial read data path, the E2E protection circuit 117 can divide the protected sector (e.g., (512+2) bytes, labeled "512B+2B" for brevity) on the partial read data path into the any sector (e.g., 512 bytes, labeled "512B" for brevity) and the E2E protection information (e.g., 2 bytes, labeled "2B" for brevity), and utilize the E2E check circuit 117C to perform E2E check on the any sector according to the E2E protection information, and more particularly, calculate new E2E protection information (e.g., a new CRC code) according to the any sector and compare the new E2E protection information (e.g., the new CRC code) with the original E2E protection information (e.g., the original CRC code) of the protected sector recovered on the partial read data path, to generate an E2E check result, where the E2E check result may indicate whether the any sector on the partial read data path is correct. If the new E2E protection information (e.g., the new CRC code) is equal to the original E2E protection information (e.g., the original CRC code), the E2E check result indicates that the any sector on the partial read data path is correct; otherwise, the E2E check result indicates that the any sector on the partial read data path is incorrect. For example, in a situation where the E2E check result indicates that the any sector on the partial read data path is incorrect, the E2E check circuit 117C can send an interrupt to the microprocessor 112 to notify the microprocessor 112 of this situation, and the microprocessor 112 can trigger an E2E error handling procedure to deal with the error.

Figure 3:
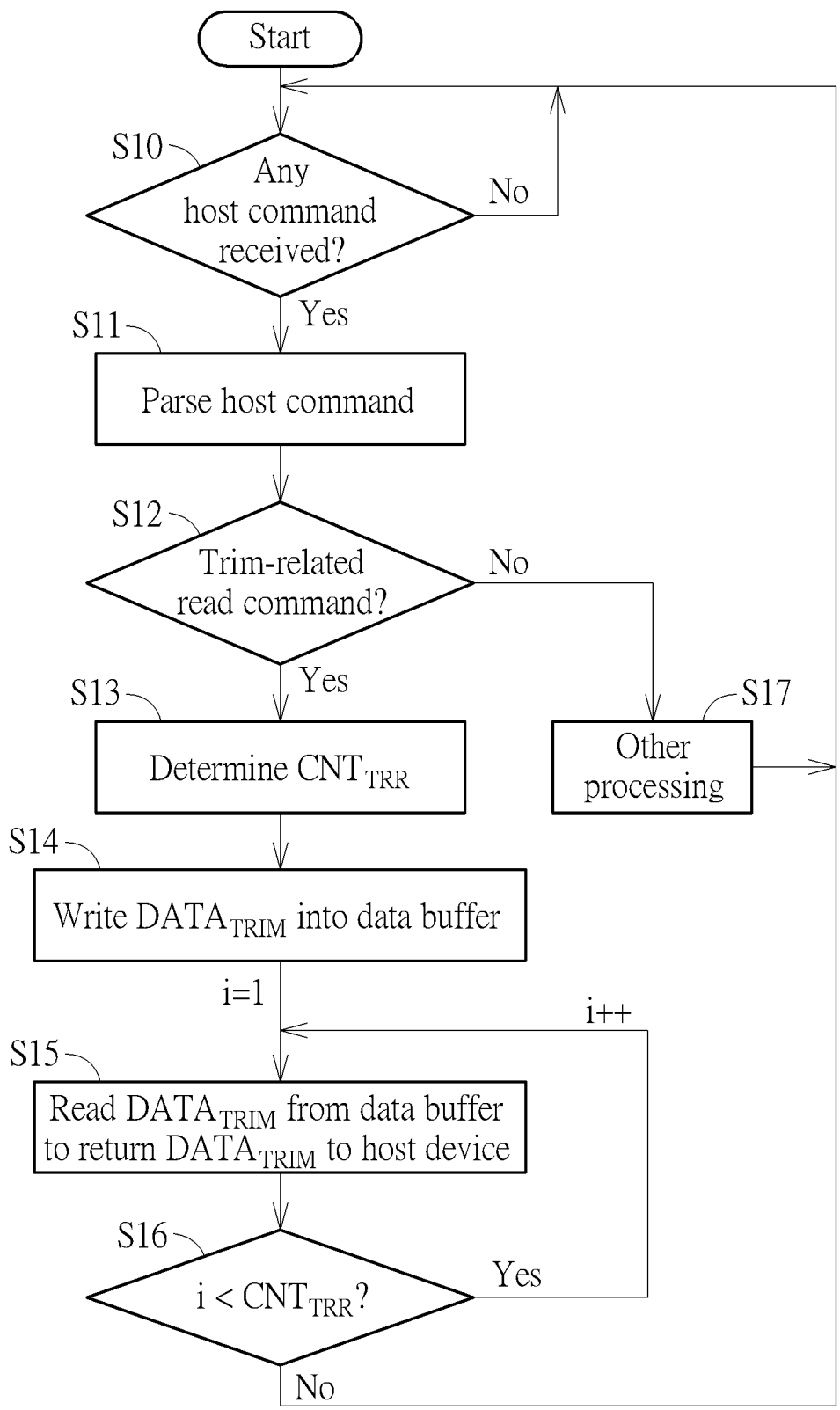
FIG. 3 is a diagram illustrating a trim-related read control scheme of a method for performing access management of a memory device such as the memory device shown in FIG. 1 with aid of buffer usage reduction control according to an embodiment of the instant application.

FIG. 3 is a diagram illustrating a trim-related read control scheme of a method for performing access management of a memory device such as the memory device 100 shown in FIG. 1 with aid of buffer usage reduction control according to an embodiment of the instant application. The method can be applied to the memory device 100 shown in FIG. 1, and can be applied to the memory controller 110 within the memory device 100, as well as the microprocessor 112, the control logic circuit 114, the RAM 116, the E2E protection circuit 117, and the transmission interface circuit 118, etc. therein, and more particularly, can be applied to the internal protection architecture shown in FIG. 2.

In Step S10, the memory controller 110 can determine whether any host command (e.g., one of the plurality of host commands) is received from the host device 50. If Yes, Step S11 is entered; if No, Step S11 is entered to wait for the any host command.

In Step S11, the memory controller 110 can parse the any host command (e.g., the host command that has just received as determined in Step S10) to determine the associated information of the any host command. For example, the associated information of the any host command may comprise an operation code, and more particularly, may further comprise a logical address and a data length, where the operation code may indicate an operation to be performed as requested by the host device 50, such as any of a write operation, a read operation, etc., but the invention is not limited thereto.

In Step S12, the memory controller 110 can determine whether the any host command among the plurality of host commands from the host device 50 is a trim-related read command. If Yes, Step S13 is entered; if No, Step S17 is entered. For example, the trim-related read command may represent a read command indicating that reading from at least one trimmed location is required.

For better comprehension, the aforementioned at least one trimmed location may represent at least one logical address at which no valid data exists. For example, in response to a trim command that is previously received from the host device 50, the memory controller 110 can perform trim processing to make any data stored at the physical address associated with the aforementioned at least one logical address become invalid, and therefore, no valid data exists at the aforementioned at least one trimmed location such as the aforementioned at least one logical address. In this situation, the host device 50 may send the trim-related read command to the memory device 100, for obtaining the response corresponding to the trim-related read command from the memory device 100, in order to determine whether the trim processing is successfully performed as requested by the host device 50.

In Step S13, in response to the any host command being the trim-related read command, the memory controller 110 can determine an estimated trim-related read operation count $CNT_{TRR}$ regarding the data buffer 116DB within the memory controller 110 according to a trimmed range of the aforementioned at least one trimmed location and a predetermined unit size of accessing the data buffer 116DB, and more particularly, divide a total size of the trimmed range by the predetermined unit size to determine the estimated trim-related read operation count $CNT_{TRR}$, where the data buffer 116DB is implemented with the storage region SR of the RAM 116. For better comprehension, the predetermined unit size may represent the size of a single sector, such as 512 bytes (B), i.e., 0.5 kilobytes (KB), for example, when the total size of the trimmed range is equal to 128 KB, $CNT_{TRR}=((128\text{ KB})/(0.5\text{ KB}))=256$, but the invention is not limited thereto. According to some embodiments, the predetermined unit size may represent any of some other predetermined values, and/or the total size of the trimmed range may vary.

In Step S14, the memory controller 110 can write predetermined trimmed data $DATA_{TRIM}$ having the predetermined unit size into the data buffer 116DB, where the predetermined trimmed data $DATA_{TRIM}$ carries a predetermined data pattern. For example, the predetermined data pattern may represent any of an all-zero data pattern and an all-one data pattern.

In the loop comprising Steps S15 and S16, the memory controller 110 can control the transmission interface circuit 118 to read the predetermined trimmed data $DATA_{TRIM}$ from the data buffer 116DB multiple times, for being returned to the host device 50, where a time count of the multiple times is equal to the estimated trim-related read operation count $CNT_{TRR}$. For example, the memory controller 110 can set and/or update the loop index i of this loop, and more particularly, can set the loop index i to be a predetermined initial value such as one when Steps S15 is entered for the first time among the multiple times (labeled "i=1" for brevity), and may increase the loop index i with a predetermined increment such as one (labeled "i++" for brevity) when Steps S15 is entered another time, but the invention is not limited thereto.

In Step S15, the memory controller 110 can read the predetermined trimmed data $DATA_{TRIM}$ from the data buffer 116DB to return the predetermined trimmed data $DATA_{TRIM}$ to the host device 50.

In Step S16, the memory controller 110 can determine whether to repeat the operation of Step S15, and more particularly, determine whether the loop index i is less than the estimated trim-related read operation count $CNT_{TRR}$. If Yes, Step S15 is entered; if No, Step S10 is entered.

As a result of executing the loop comprising Steps S15 and S16, the memory controller 110 can control the transmission interface circuit 118 to read the predetermined trimmed data $DATA_{TRIM}$ from the data buffer 116DB the multiple times, for returning combined trimmed data $\{DATA_{TRIM}\}$ to the host device 50, where the combined trimmed data $\{DATA_{TRIM}\}$ may comprise the predetermined trimmed data $\{DATA_{TRIM}\}$ and at least one copy (e.g., one or more copies) of the predetermined trimmed data $DATA_{TRIM}$, such as $\{DATA_{TRIM}, DATA_{TRIM}, \ldots, DATA_{TRIM}\}$.

In Step S17, in response to the any host command being the trim-related read command, the memory controller 110 can perform other processing. Afterward, Step S10 is entered.

According to this embodiment, the trim-related read command can be a read trim command carrying a first logical address and a data length (e.g., 128 KB), but the present invention is not limited thereto. In addition, a combination of the first logical address and the data length may indicate the trimmed range of the aforementioned at least one trimmed location, where the total size of the trimmed range is equal to the data length.

For better comprehension, the method may be illustrated with the working flow shown in FIG. 3, but the present invention is not limited thereto. According to some embodiments, one or more steps may be added, deleted, or changed in the working flow shown in FIG. 3.

According to some embodiments, the memory controller 110 can record, maintain, and/or update the aforementioned at least one L2P address mapping table such as the L2P table FTLT to record the latest mapping relationships between the logical addresses and the physical addresses, as well as the latest status of the aforementioned at least one trimmed location, to allow the memory controller 110 to determine the aforementioned at least one trimmed location (e.g., determine whether the aforementioned at least one logical address has been trimmed) according to the L2P address mapping table such as the L2P table FTLT. For brevity, similar descriptions for these embodiments are not repeated in detail here.

According to some embodiments, the trim-related read command may carry trimmed range information indicating the trimmed range of the aforementioned at least one trimmed location, and the trimmed range may comprise the aforementioned at least one logical address. For example, at least one L2P table entry corresponding to the aforementioned at least one logical address among multiple L2P table entries within the L2P address mapping table such as the L2P table FTLT may comprise predetermined information (e.g., a default value) for indicating that no valid data exists at the at least one logical address. In a situation where the trim-related read command is the read trim command carrying the first logical address and the data length (e.g., 128 KB), the trimmed range information may comprise the first logical address and the data length. In addition, the predetermined information such as the default value can be implemented by way of a physical address exceeding a physical address range of all possible physical addresses, such as a hexadecimal value 0xFFFFFFFF or any of some other values. For brevity, similar descriptions for these embodiments are not repeated in detail here.

According to some embodiments, during initialization of the memory device 100, the memory controller 110 can send a capability report to indicate at least one capability that the memory device 100 (e.g., the memory controller 110 therein) supports, such as the capability of sending the trimmed data (e.g., the combined trimmed data $\{DATA_{TRIM}\}$) carrying the predetermined data pattern, where the operation of sending the capability report can be performed in response to a predetermined command from the host device 50, but the present invention is not limited thereto. More particularly, the memory controller 110 can notify the host device 50 of any capability (e.g., each capability) of the following capabilities:

(1) sending the trimmed data (e.g., the combined trimmed data $\{DATA_{TRIM}\}$) carrying the predetermined data pattern such as the all-zero data pattern; and (2) sending the trimmed data (e.g., the combined trimmed data $\{DATA_{TRIM}\}$) carrying the predetermined data pattern such as the all-one data pattern;

but the present invention is not limited thereto. In addition, when the host device 50 sends the trim-related read command to the memory device 100, the memory controller 110 can send the trimmed data (e.g., the combined trimmed data $\{DATA_{TRIM}\}$) carrying the predetermined data pattern to the host device 50, for indicating that the trim processing is successfully performed as requested by the host device 50. For example, when the predetermined data pattern represents the all-zero data pattern, the memory controller 110 can control each bit in each byte of the predetermined trimmed data $DATA_{TRIM}$ to be zero, making all bits in each byte of the trimmed data (e.g., the combined trimmed data $\{DATA_{TRIM}\}$) be equal to zero. For another example, when the predetermined data pattern represents the all-one data pattern, the memory controller 110 can control each bit in each byte of the predetermined trimmed data $DATA_{TRIM}$ to be one, making all bits in each byte of the trimmed data (e.g., the combined trimmed data $\{DATA_{TRIM}\}$) be equal to one. For brevity, similar descriptions for these embodiments are not repeated in detail here.

Figure 4:
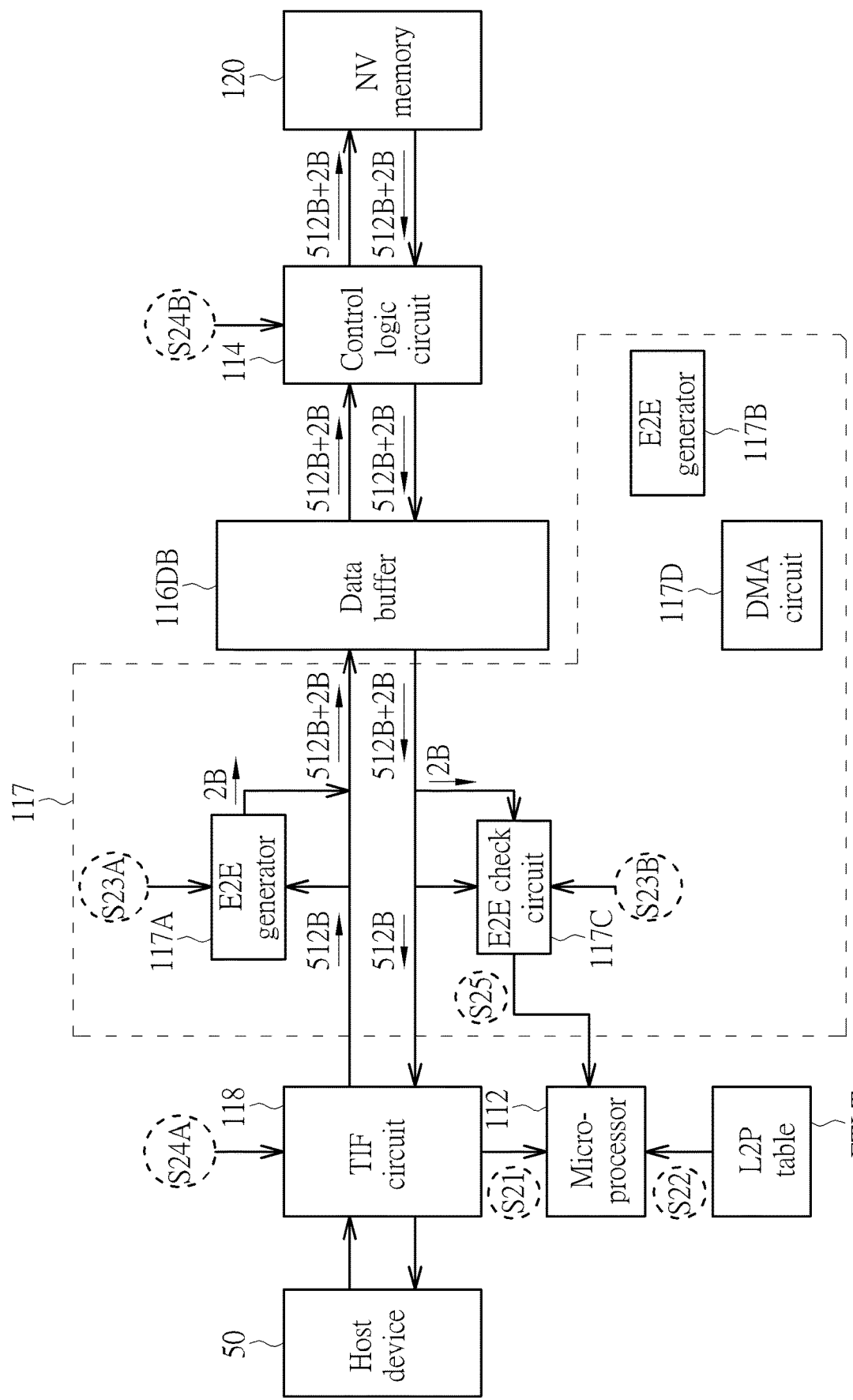
FIG. 4 is a diagram illustrating an internal protection control scheme of the method according to an embodiment of the instant application.

FIG. 4 is a diagram illustrating an internal protection control scheme of the method according to an embodiment of the instant application.

In Step S21, the memory controller 110 (e.g., the microprocessor 112) can parse a host command such as the any host command mentioned above, and more particularly, determine whether the host command is the trim-related read command (e.g., the read trim command).

In Step S22, the memory controller 110 (e.g., the microprocessor 112) can selectively read or update the L2P table FTLT. For example, when the host command is a write command for writing data at a target logical address, the memory controller 110 can determine a target physical address such as the physical address at which data should be written (e.g., programed), and update the L2P table FTLT to record the target physical address into the L2P table FTLT to indicate a mapping relationship between the target logical address and the target physical address. For another example, when the host command is a read command for reading the data at the target logical address, the memory controller 110 can read the L2P table FTLT to obtain mapping relationship between the target logical address and the target physical address, and more particularly, obtain the target physical address, for reading the data at the target physical address.

In Step S23A, the memory controller 110 (e.g., the microprocessor 112) can selectively configure a first portion of the E2E protection circuit 117. For example, when the host command is the write command for writing the data at the target logical address, the memory controller 110 can configure a set of E2E protection parameters of the E2E protection circuit 117, such as an initial logical block address (LBA) and a hardware (HW)-processing data size (e.g., a sector size of each sector), into the E2E generator 117A, to allow the E2E protection circuit 117 to operate automatically when triggered.

In Step S23B, the memory controller 110 (e.g., the microprocessor 112) can selectively configure a second portion of the E2E protection circuit 117. For example, when the host command is the read command for reading the data at the target logical address, the memory controller 110 can configure the set of E2E protection parameters such as the initial LBA and the HW-processing data size (e.g., the sector size of each sector) into the E2E check circuit 117C, to allow the E2E protection circuit 117 to operate automatically when triggered.

In Step S24A, the memory controller 110 (e.g., the microprocessor 112) can trigger the transmission interface circuit 118 (labeled "TIF circuit" for brevity) to start operating in response to the host command. For example, when the host command is the write command for writing the data at the target logical address, the transmission interface circuit 118 can obtain the data to be written from the host device 50 and send the data to the E2E protection circuit 117. For another example, when the host command is the read command for reading the data at the target logical address, the transmission interface circuit 118 can obtain the read data from the E2E protection circuit 117 and return the read data to the host device 50.

In Step S24B, the memory controller 110 (e.g., the microprocessor 112) can trigger the control logic circuit 114 to start operating in response to the host command. For example, when the host command is the write command for writing the data at the target logical address, the control logic circuit 114 can utilize the data protection circuit (e.g., the ECC circuit) to perform the data protection (e.g., the ECC protection), and utilize the randomizer circuit to perform the randomizing operation. For another example, when the host command is the read command for reading the data at the target logical address, the control logic circuit 114 can utilize the de-randomizer circuit to perform the de-randomizing operation, and utilize the data protection circuit (e.g., the ECC circuit) to perform the error detection, and more particularly, for the case that the any error is detected during the error detection, perform the error correction.

Based on the configuration of Step S23A and/or the configuration of Step S23B, the E2E protection circuit 117 can operate automatically after the operations of Steps S24A and S24B, where the memory controller 110 (e.g., the microprocessor 112) can trigger the control logic circuit 114 and the transmission interface circuit 118, together with the E2E protection circuit 117, to start operating in response to the host command (e.g., any command among the write command and the read command). Regarding the E2E protection corresponding to the partial write data path, the E2E protection circuit 117 can utilize the E2E generator 117A to generate the E2E protection information (e.g., 2 bytes, labeled "2B" for brevity) according to the any sector (e.g., 512 bytes, labeled "512B" for brevity), and combine the any sector and the E2E protection information into the protected sector corresponding to the any sector and write the protected sector in the data buffer 116DB, for further processing on the partial write data path, where the E2E protection information can be implemented by way of the CRC code. Regarding the E2E protection corresponding to the partial read data path, the E2E protection circuit 117 can utilize the E2E check circuit 117C to perform the E2E check on the any sector (e.g., 512 bytes, labeled "512B" for brevity) according to the E2E protection information (e.g., 2 bytes, labeled "2B" for brevity), and more particularly, calculate the new E2E protection information (e.g., the new CRC code) according to the any sector and compare the new E2E protection information (e.g., the new CRC code) with the original E2E protection information (e.g., the original CRC code) of the protected sector recovered on the partial read data path, to generate the E2E check result.

In Step S25, the memory controller 110 (e.g., the E2E check circuit 117C) can perform the E2E check to selectively send an interrupt to the microprocessor 112. For example, if the E2E check result indicates that the any sector (e.g., a sector of the buffered read data that is obtained from reading at the target physical address) on the partial read data path is incorrect, the E2E check circuit 117C can send the interrupt to the microprocessor 112 to notify the microprocessor 112 of this situation, to allow the microprocessor 112 to trigger the E2E error handling procedure to deal with the error; otherwise, the E2E check circuit 117C can prevent sending the interrupt to the microprocessor 112.

Figure 5:
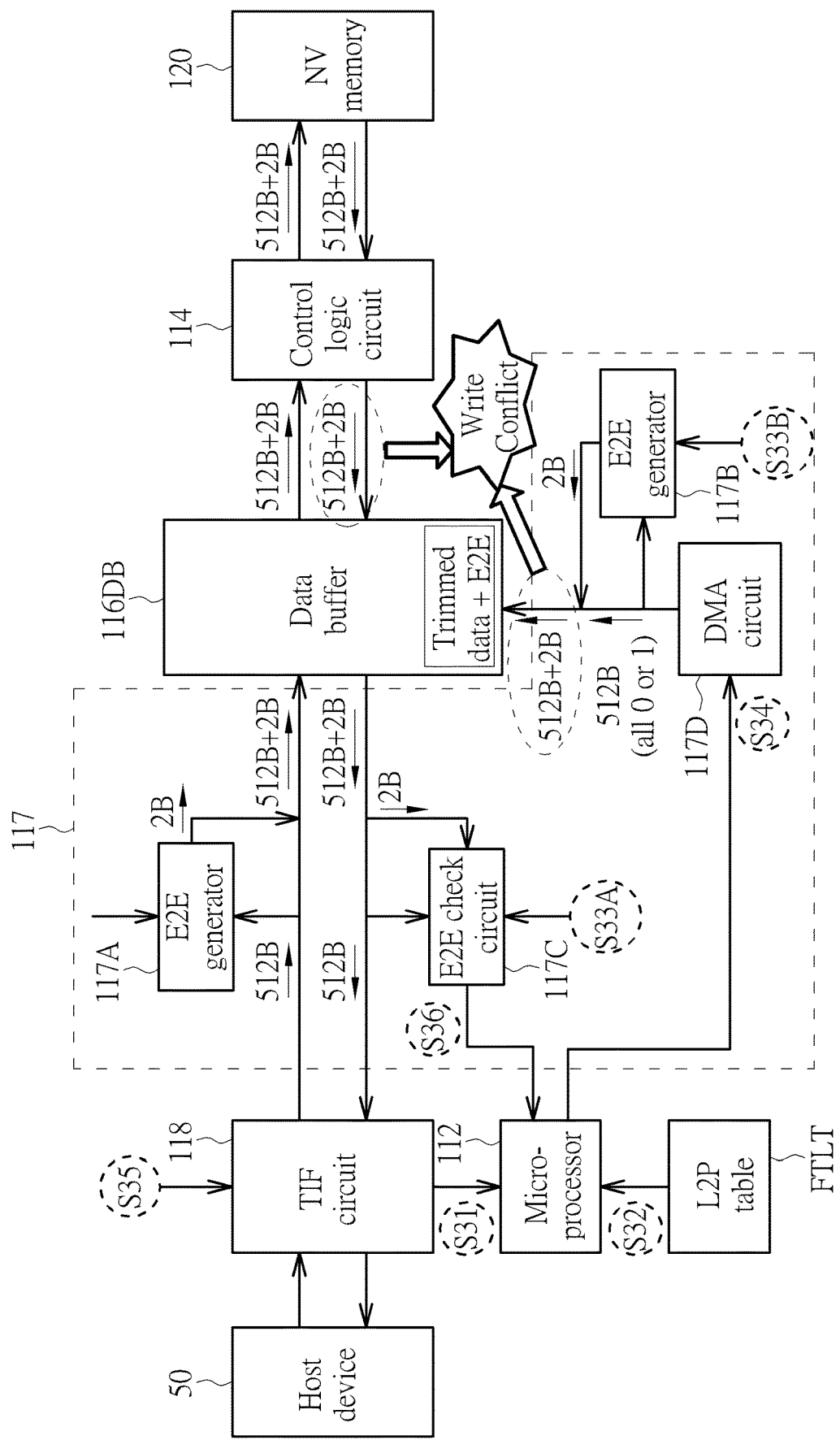
FIG. 5 is a diagram illustrating a first hybrid control scheme applicable to the internal protection architecture shown in FIG. 2, where at least one portion of the associated control in the trim-related read control scheme shown in FIG. 3 is temporarily disabled.

FIG. 5 is a diagram illustrating a first hybrid control scheme applicable to the internal protection architecture shown in FIG. 2, where at least one portion (e.g., a portion or all) of the associated control in the trim-related read control scheme shown in FIG. 3 is temporarily disabled.

In Step S31, the memory controller 110 (e.g., the microprocessor 112) can parse a host command such as the any host command mentioned above, and more particularly, determine whether the host command is the trim-related read command (e.g., the read trim command).

In Step S32, the memory controller 110 (e.g., the microprocessor 112) can selectively read or update the L2P table FTLT. For example, when the host command is the trim-related read command for reading target trimmed data at a target logical address, such as the read trim command for reading the trimmed data starting from the first logical address, the memory controller 110 can read the L2P table FTLT to determine whether a target L2P table entry corresponding to the target logical address among the multiple L2P table entries within the L2P table FTLT comprise the predetermined information (e.g., the default value). For better comprehension, assume that the target L2P table entry comprises the predetermined information. In this situation, the memory controller 110 can determine that the target logical address is a trimmed location.

In Step S33A, the memory controller 110 (e.g., the microprocessor 112) can selectively configure the second portion of the E2E protection circuit 117. For example, when the host command is the trim-related read command (e.g., the read trim command) for reading the target trimmed data at the target logical address, the memory controller 110 can configure the set of E2E protection parameters such as the initial LBA and the HW-processing data size (e.g., the sector size of each sector) into the E2E check circuit 117C, to allow the E2E protection circuit 117 to operate automatically when triggered.

In Step S33B, the memory controller 110 (e.g., the microprocessor 112) can selectively configure a third portion of the E2E protection circuit 117. For example, when the host command is the trim-related read command (e.g., the read trim command) for reading the target trimmed data at the target logical address, the memory controller 110 can configure the set of E2E protection parameters such as the initial LBA and the HW-processing data size (e.g., the sector size of each sector) into the E2E generator 117B, to allow the E2E protection circuit 117 to operate automatically when triggered.

In Step S34, the memory controller 110 (e.g., the microprocessor 112) can trigger the DMA circuit 117D to start performing multiple DMA write operations for writing the trimmed data into the data buffer 116DB, and enable the E2E generator 117B.

In Step S35, the memory controller 110 (e.g., the microprocessor 112) can trigger the transmission interface circuit 118 (labeled "TIF circuit" for brevity) to start operating in response to the host command.

Based on the configuration of Step S33A and the configuration of Step S33B, the E2E protection circuit 117 can operate automatically after the operations of Steps S34 and S35, where the memory controller 110 (e.g., the microprocessor 112) can trigger the transmission interface circuit 118, together with the E2E protection circuit 117, to start operating in response to the host command such as the trim-related read command. As shown in the lower right corner of FIG. 5, the E2E protection circuit 117 can utilize the DMA circuit 117D to generate any trimmed-data sector (e.g., 512 bytes, labeled "512B (all 0 or 1)" for brevity) among multiple trimmed-data sectors of the trimmed data, and more particularly, utilize the E2E generator 117B to generate trimmed-data E2E protection information (e.g., 2 bytes, labeled "2B" for brevity) according to the any trimmed-data sector, and combine the any trimmed-data sector and the trimmed-data E2E protection information into a protected trimmed-data sector (labeled "512B+2B" for brevity) corresponding to the any trimmed-data sector and write the protected trimmed-data sector into a secondary buffer region of the data buffer 116DB (labeled "Trimmed data+E2E" for brevity), for further processing on the partial read data path, where the trimmed-data E2E protection information can be implemented by way of the CRC code.

In Step S36, the memory controller 110 (e.g., the E2E check circuit 117C) can perform the E2E check on the any trimmed-data sector according to the trimmed-data E2E protection information, to selectively send an interrupt to the microprocessor 112, where the E2E check regarding the any trimmed-data sector can be performed in a similar manner as that of the E2E check regarding the any sector within the read data. For example, if the E2E check result indicates that the any trimmed-data sector (e.g., a sector of the trimmed data) on the partial read data path is incorrect, the E2E check circuit 117C can send the interrupt to the microprocessor 112 to notify the microprocessor 112 of this situation, to allow the microprocessor 112 to trigger the E2E error handling procedure to deal with the error; otherwise, the E2E check circuit 117C can prevent sending the interrupt to the microprocessor 112.

As shown in FIG. 5, the memory controller 110 (e.g., the microprocessor 112) can utilize the E2E generator 117B and the DMA circuit 117D to prepare the protected trimmed-data sector in the secondary buffer region of the data buffer 116DB, and utilize the same subsequent components coming after the data buffer 116DB on the partial read data path, such as the E2E check circuit 117C and the transmission interface circuit 118, to perform the subsequent processing on the partial read data path, and therefore can process the any trimmed-data sector (e.g., perform the E2E check on it and return it to the host device 50) in a similar manner as that of processing the any sector within the read data.

Assuming that the storage hardware resource of the RAM 116 may be very limited, the data buffer 116DB as well as the secondary buffer region thereof may be very small, and the DMA circuit 117D may need to frequently access the data buffer 116DB within the RAM 116 to perform the multiple DMA write operations, and more particularly, write multiple protected trimmed-data sectors corresponding to the multiple trimmed-data sectors into the data buffer 116DB in a sector-by-sector manner, where the multiple protected trimmed-data sectors may comprise respective combinations of the multiple trimmed-data sectors and the respective trimmed-data E2E protection information thereof. As a result, the data buffer 116DB may occupy the write bus of the data buffer 116DB. For example, the memory controller 110 may need to operate in response to both of the trim-related read command and the read command at the same time, and therefore, a write conflict between accessing the data buffer 116DB by the DMA circuit 117D and accessing the data buffer 116DB by the control logic circuit 114 may occur (labeled "Write Conflict" for brevity).

Figure 6:
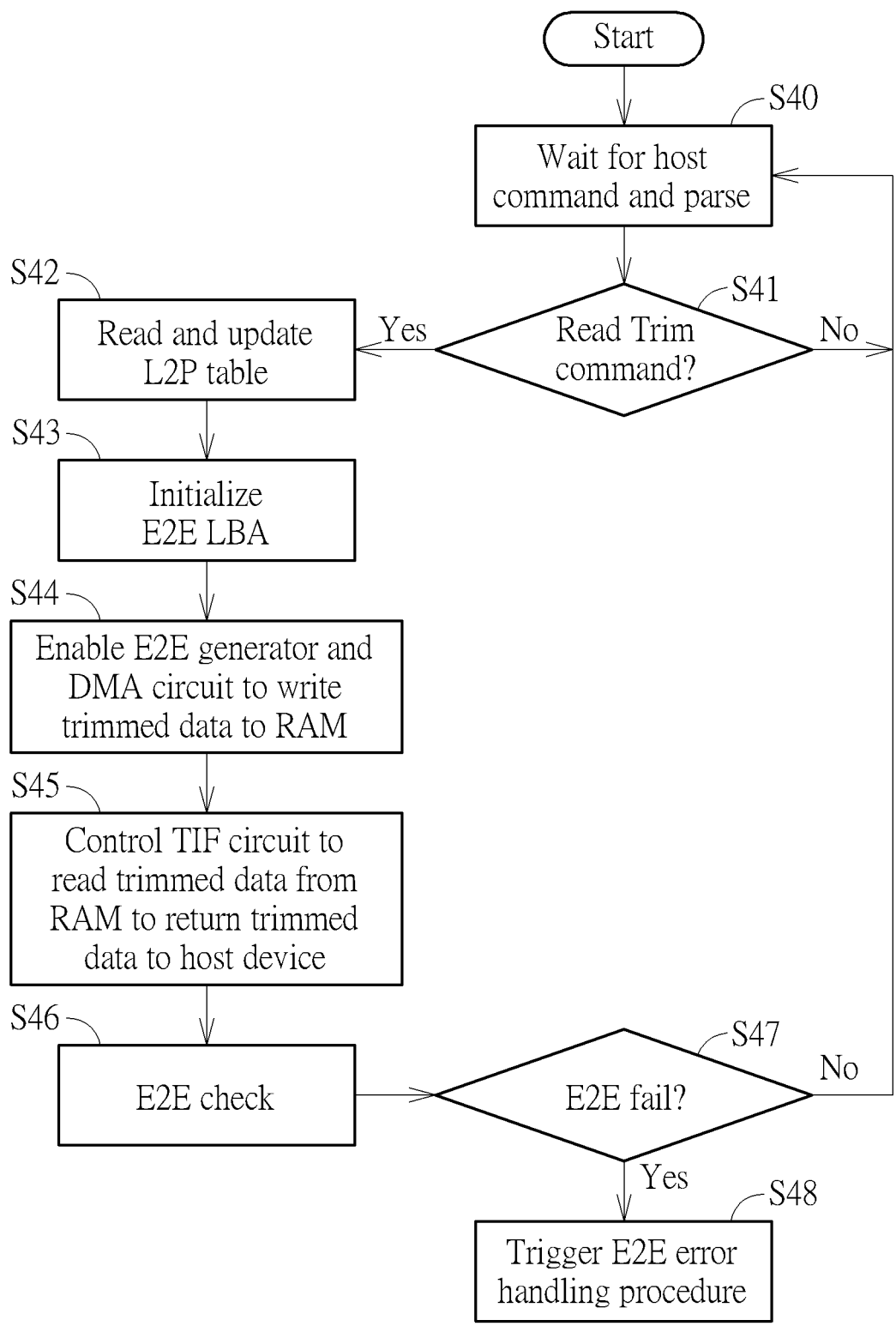
FIG. 6 illustrates a working flow regarding the first hybrid control scheme shown in FIG. 5 according to an embodiment of the instant application.

FIG. 6 illustrates a working flow regarding the first hybrid control scheme shown in FIG. 5 according to an embodiment of the instant application.

In Step S40, the memory controller 110 can wait for a host command such as the any host command mentioned above and parse the host command, for obtaining the associated information (e.g., the operation code) of the host command.

In Step S41, according to the associated information (e.g., the operation code) of the host command, the memory controller 110 can determine whether the host command is the trim-related read command such as the read trim command (labeled "Read Trim command" for brevity). If Yes, Step S42 is entered; if No, Step S40 is entered, wherein when there is a need, the memory controller 110 can perform other processing (which is not illustrated in the working flow shown in FIG. 6) before Step S40 is entered.

In Step S42, the memory controller 110 can selectively read or update the L2P table FTLT (labeled "Read and update L2P table" for brevity), where the operation of Step S42 can be the same as or similar to that of Step S32.

In Step S43, the memory controller 110 can selectively configure one or more portions of the E2E protection circuit 117, and more particularly, initialize the one or more portions of the E2E protection circuit 117 with the set of E2E protection parameters such as the initial LBA, etc. (labeled "Initialize E2E LBA" for brevity), where the operation of Step S43 may comprise the operations of Steps S33A and S33B.

In Step S44, the memory controller 110 can enable the E2E generator 117B and enable the DMA circuit 117D to write the trimmed data (e.g., the any trimmed-data sector, as well as the trimmed-data E2E protection information) into the data buffer 116DB within the RAM 116 (labeled "Enable E2E generator and DMA circuit to write trimmed data to RAM" for brevity), where the operation of Step S44 may comprise the operation of Step S34.

In Step S45, the memory controller 110 can control the transmission interface circuit 118 to read the trimmed data (e.g., the any trimmed-data sector, as well as the trimmed-data E2E protection information) from the data buffer 116DB within the RAM 116 (labeled "Control TIF circuit to read trimmed data from RAM" for brevity) to return the trimmed data to the host device 50, where the operation of Step S45 may comprise the operation of Step S35.

In Step S46, the memory controller 110 can perform the E2E check on the any trimmed-data sector according to the trimmed-data E2E protection information (labeled "E2E check" for brevity), for selectively sending the interrupt to the microprocessor 112, where the operation of Step S46 can be the same as or similar to that of Step S36.

In Step S47, according to the E2E check result, the memory controller 110 can determine whether an E2E check error occurs (labeled "E2E fail" for brevity). If Yes (e.g., the E2E check result indicates that the sector checked with the E2E check is incorrect), Step S48 is entered; if No (e.g., the E2E check result indicates that the sector checked with the E2E check is correct), Step S40 is entered.

In Step S48, the memory controller 110 can trigger the E2E error handling procedure to deal with the error.

Figure 7:
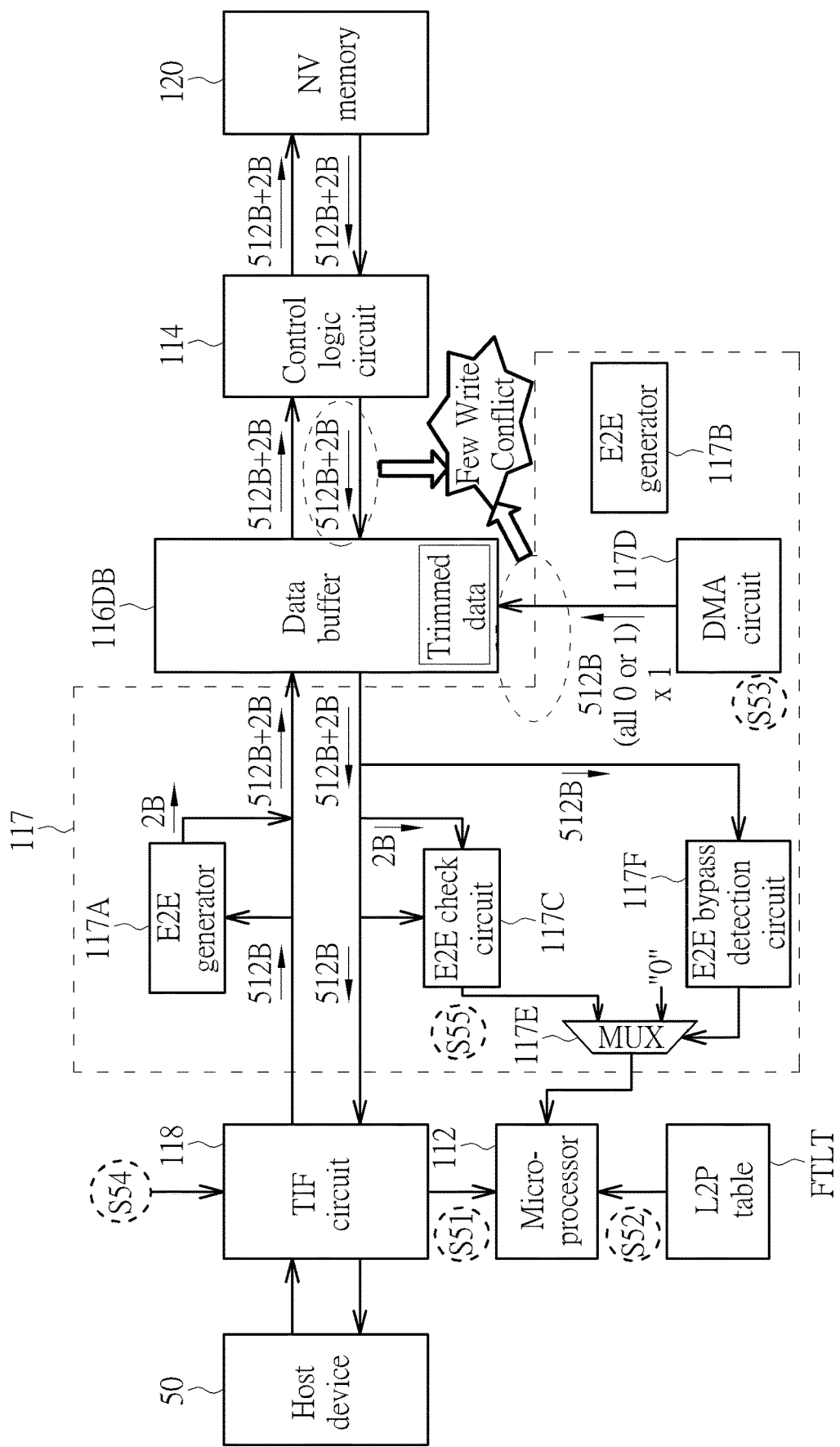
FIG. 7 is a diagram illustrating a hybrid control scheme of the method according to an embodiment of the instant application.

FIG. 7 is a diagram illustrating a hybrid control scheme of the method according to an embodiment of the instant application.

In Step S51, the memory controller 110 (e.g., the microprocessor 112) can parse a host command such as the any host command mentioned above, and more particularly, determine whether the host command is the trim-related read command (e.g., the read trim command).

In Step S52, the memory controller 110 (e.g., the microprocessor 112) can selectively read or update the L2P table FTLT. For example, when the host command is the trim-related read command for reading target trimmed data at a target logical address, such as the read trim command for reading the trimmed data starting from the first logical address, the memory controller 110 can read the L2P table FTLT to determine whether a target L2P table entry corresponding to the target logical address among the multiple L2P table entries within the L2P table FTLT comprise the predetermined information (e.g., the default value). For better comprehension, assume that the target L2P table entry comprises the predetermined information. In this situation, the memory controller 110 can determine that the target logical address is a trimmed location.

In Step S53, the memory controller 110 (e.g., the microprocessor 112) can trigger the DMA circuit 117D to start performing multiple DMA write operations for writing the trimmed data into the data buffer 116DB, having no need to enable the E2E generator 117B as mentioned in Step S34 of the first hybrid control scheme shown in FIG. 5.

In Step S54, the memory controller 110 (e.g., the microprocessor 112) can trigger the transmission interface circuit 118 (labeled "TIF circuit" for brevity) to start operating in response to the host command.

The E2E protection circuit 117 can operate automatically after the operations of Steps S53 and S54, where the memory controller 110 (e.g., the microprocessor 112) can trigger the transmission interface circuit 118, together with the E2E protection circuit 117, to start operating in response to the host command such as the trim-related read command. As shown in the lower half of FIG. 5, the multiple sub-circuits of the E2E protection circuit 117 may further comprise a multiplexer circuit 117E (labeled "MUX" for brevity) and an E2E bypass detection circuit 117F. More particularly, the multiplexer circuit 117E can be positioned on the interrupt transmission path from the E2E check circuit 117C to the microprocessor 112, and the E2E bypass detection circuit 117F can be coupled to an output node of the data buffer 116DB, and can perform E2E bypass detection on any output data (e.g., the any sector within the read data or the any trimmed-data sector) at the output node of the data buffer 116DB, to generate a selection signal for selecting one of multiple inputs of the multiplexer circuit 117E. As a result, the E2E protection circuit 117 can automatically operate in response to the host command, no matter whether the host command is any of the read command, the trim-related read command, etc.

As shown in the lower right corner of FIG. 5, the E2E protection circuit 117 can utilize the DMA circuit 117D to generate a single trimmed-data sector (e.g., 512 bytes, labeled "512B (all 0 or 1)" for brevity) in response to the trim-related read command, and more particularly, generate and write the single trimmed-data sector into the data buffer 116DB only once (labeled "×1" for brevity), to allow the transmission interface circuit 118 to repeatedly read the single trimmed-data sector as the any trimmed-data sector, for being returned to the host device 50, having no need to utilize the E2E generator 117B to generate any trimmed-data E2E protection information corresponding to the single trimmed-data sector. In addition, the E2E bypass detection circuit 117F can perform the E2E bypass detection on the any output data at the output node of the data buffer 116DB, in order to determine whether the any output data is the any sector within the read data or the any trimmed-data sector.

For example, when the any output data is the any trimmed-data sector (e.g., the single trimmed-data sector), the E2E bypass detection circuit 117F can set the selection signal to be in a first predetermined state to control the multiplexer circuit 117E to select a first input (e.g., the lower input) among the multiple inputs of the multiplexer circuit 117E, to disable the interrupt transmission path and enable the E2E bypass path from a default logic level (e.g., an inactive logic level) such as the logic level "0" to the microprocessor 112, for bypassing the E2E check. As a result, no interrupt will be sent to the microprocessor 112. For another example, when the any output data is the any sector within the read data, the E2E bypass detection circuit 117F can set the selection signal to be in a second predetermined state to control the multiplexer circuit 117E to select a second input (e.g., the upper input) among the multiple inputs of the multiplexer circuit 117E, to enable the interrupt transmission path and disable the E2E bypass path. As a result, the memory controller 110 (e.g., the E2E check circuit 117C) can operate as usual (e.g., perform the E2E check on the any sector within the read data according to the E2E protection information to selectively send the interrupt to the microprocessor 112) in response to the read command.

As the E2E protection circuit 117 can utilize the DMA circuit 117D to write the single trimmed-data sector such as the predetermined trimmed data $DATA_{TRIM}$ into the data buffer 116DB only once to be the same trimmed data (labeled "Trimmed data" for brevity) for being repeatedly read as the any trimmed-data sector by the transmission interface circuit 118, the memory controller 110 can greatly reduce the probability of the occurrence of the write conflict between accessing the data buffer 116DB by the DMA circuit 117D and accessing the data buffer 116DB by the control logic circuit 114 (labeled "Few Write Conflict" for brevity), and more particularly, can prevent the write conflict.

In Step S55, the memory controller 110 (e.g., the E2E check circuit 117C) can perform the E2E check on the any output data at the output node of the data buffer 116DB. For example, when the any output data is the any trimmed-data sector (e.g., the single trimmed-data sector), no interrupt will be sent to the microprocessor 112. For another example, when the any output data is the any sector within the read data, the memory controller 110 (e.g., the E2E check circuit 117C) can operate as usual (e.g., perform the E2E check on the any sector within the read data according to the E2E protection information to selectively send the interrupt to the microprocessor 112) in response to the read command. More particularly, if the E2E check result indicates that the any sector within the read data on the partial read data path is incorrect, the E2E check circuit 117C can send the interrupt to the microprocessor 112 to notify the microprocessor 112 of this situation, to allow the microprocessor 112 to trigger the E2E error handling procedure to deal with the error; otherwise, the E2E check circuit 117C can prevent sending the interrupt to the microprocessor 112.

Figure 8:
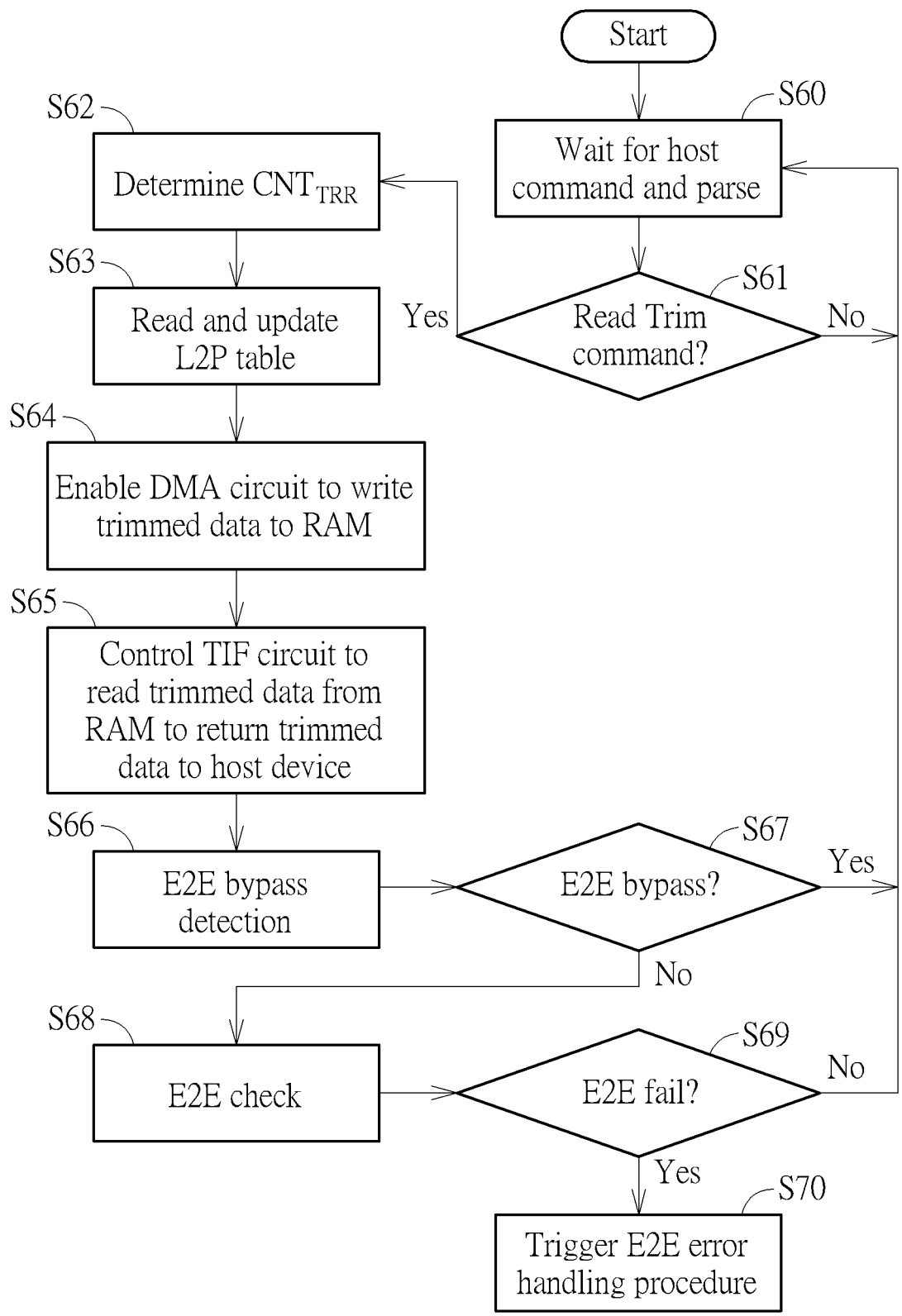
FIG. 8 illustrates a working flow regarding the hybrid control scheme shown in FIG. 7 according to an embodiment of the instant application.

FIG. 8 illustrates a working flow regarding the hybrid control scheme shown in FIG. 7 according to an embodiment of the instant application.

In Step S60, the memory controller 110 can wait for a host command such as the any host command mentioned above and parse the host command, for obtaining the associated information (e.g., the operation code) of the host command.

In Step S61, according to the associated information (e.g., the operation code) of the host command, the memory controller 110 can determine whether the host command is the trim-related read command such as the read trim command (labeled "Read Trim command" for brevity). If Yes, Step S62 is entered; if No, Step S60 is entered, wherein when there is a need, the memory controller 110 can perform other processing (which is not illustrated in the working flow shown in FIG. 8) before Step S60 is entered.

In Step S62, the memory controller 110 can determine the estimated trim-related read operation count $CNT_{TRR}$ regarding the data buffer 116DB, where the operation of Step S62 can be the same as or similar to that of Step S13.

In Step S63, the memory controller 110 can selectively read or update the L2P table FTLT (labeled "Read and update L2P table" for brevity), where the operation of Step S63 can be the same as or similar to that of Step S52.

In Step S64, the memory controller 110 can enable the DMA circuit 117D to write the trimmed data (e.g., the single trimmed-data sector) into the data buffer 116DB within the RAM 116 (labeled "Enable DMA circuit to write trimmed data to RAM" for brevity), where the operation of Step S64 may comprise the operation of Step S53.

In Step S65, the memory controller 110 can control the transmission interface circuit 118 to read the trimmed data (e.g., the any trimmed-data sector such as the single trimmed-data sector) from the data buffer 116DB within the RAM 116 (labeled "Control TIF circuit to read trimmed data from RAM" for brevity) to return the trimmed data to the host device 50, where the operation of Step S65 may comprise the operation of Step S54.

In Step S66, the memory controller 110 can perform the E2E bypass detection on the any output data at the output node of the data buffer 116DB to generate an E2E bypass detection result, for indicating whether the any output data is the any sector within the read data or the any trimmed-data sector.

In Step S67, according to the E2E bypass detection result of the E2E bypass detection, the memory controller 110 can determine whether to bypass the E2E check (labeled "E2E bypass" for brevity). If Yes, Step S60 is entered; if No, Step S68 is entered.

In Step S68, the memory controller 110 can perform the E2E check on the any trimmed-data sector according to the trimmed-data E2E protection information (labeled "E2E check" for brevity), for selectively sending the interrupt to the microprocessor 112, where the operation of Step S68 can be the same as or similar to that of Step S55.

In Step S69, according to the E2E check result, the memory controller 110 can determine whether an E2E check error occurs (labeled "E2E fail" for brevity). If Yes (e.g., the E2E check result indicates that the sector checked with the E2E check is incorrect), Step S70 is entered; if No (e.g., the E2E check result indicates that the sector checked with the E2E check is correct), Step S60 is entered.

In Step S70, the memory controller 110 can trigger the E2E error handling procedure to deal with the error.

For better comprehension, the method may be illustrated with the working flow shown in FIG. 8, but the present invention is not limited thereto. According to some embodiments, one or more steps may be added, deleted, or changed in the working flow shown in FIG. 8.

Figure 9:
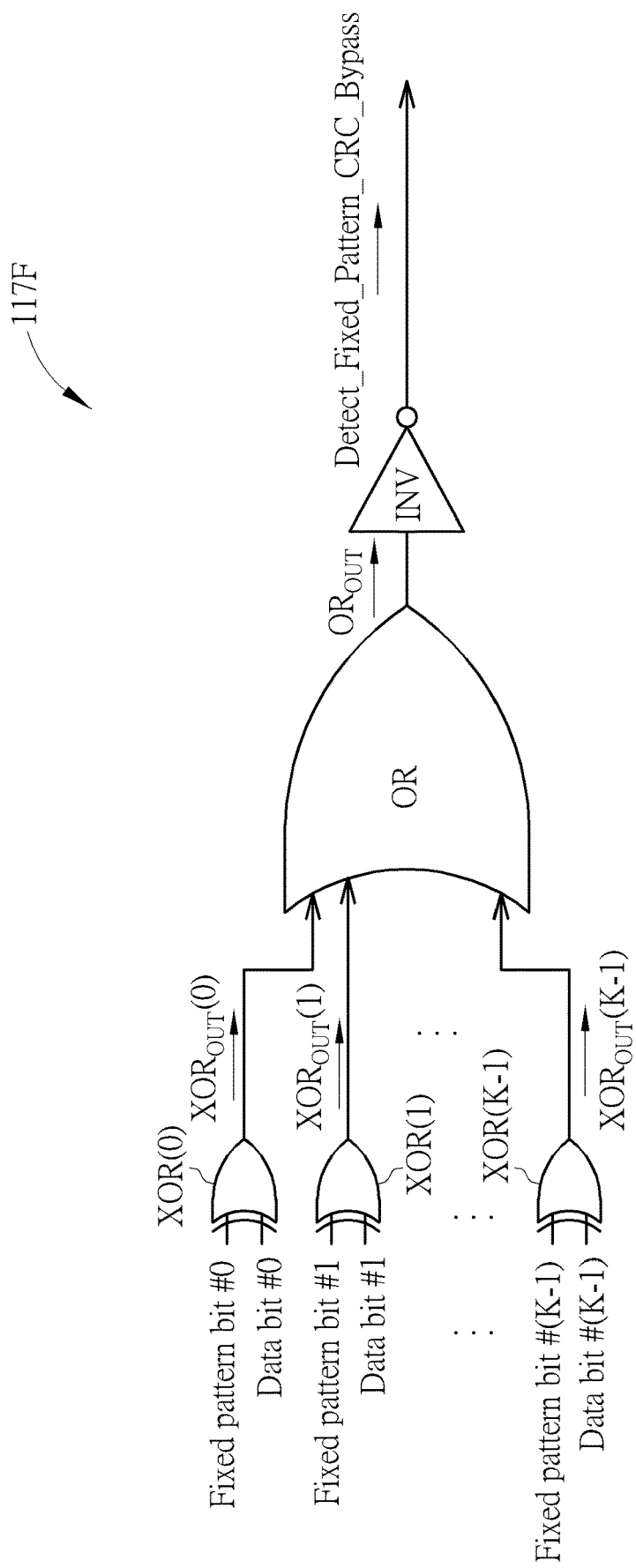
FIG. 9 illustrates some implementation details of the hybrid control scheme shown in FIG. 7 according to an embodiment of the instant application.

FIG. 9 illustrates some implementation details of the hybrid control scheme shown in FIG. 7 according to an embodiment of the instant application. The E2E bypass detection circuit 117F may comprise multiple XOR gates (labeled "XOR" for brevity) such as K XOR gates XOR(1), XOR(2), . . . and XOR(K−1), an OR gate (labeled "OR" for brevity) and an inverter (labeled "INV" for brevity), where the symbol "K" can represent a bus width of a data bus for reading the any output data at the output node of the data buffer 116DB, and can be a positive integer greater than one. For better comprehension, K=128, but the invention is not limited thereto. According to some embodiments, the bus width K can be equal to any of some other predetermined values.

The E2E bypass detection circuit 117F can read multiple subsets (e.g., each having K bits) of the any output data in turn, and more particularly, read any subset (e.g., K bits) among the multiple subsets of the any output data to be the data bits #0, #1, . . . and #(K−1), for being input into the K XOR gates XOR(1), XOR(2), . . . and XOR(K−1), where the fixed pattern bits #0, #1, . . . and #(K−1) corresponds to the predetermined data pattern. For example, when the predetermined data pattern represents the all-zero data pattern, the memory controller 110 can control each bit of the fixed pattern bits #0, #1, . . . and #(K−1) to be zero. For another example, when the predetermined data pattern represents the all-one data pattern, the memory controller 110 can control each bit of the fixed pattern bits #0, #1, . . . and #(K−1) to be one. In addition, the K XOR gates XOR(1), XOR(2), . . . and XOR(K−1) can perform XOR operations on the data bits #0, #1, . . . and #(K−1) and the fixed pattern bits #0, #1, . . . and #(K−1) to generate K XOR gate outputs $XOR_{OUT}(1)$, $XOR_{OUT}(2)$, . . . and $XOR_{OUT}(K-1)$, respectively. The OR gate can perform at least one OR operation on the K XOR gate outputs $XOR_{OUT}(1)$, $XOR_{OUT}(2)$, . . . and $XOR_{OUT}(K-1)$ to generate an OR gate output $OR_{OUT}$. The inverter can invert the logic state (e.g., logical level) of the OR gate output $OR_{OUT}$ to generate an inverted signal of the OR gate output $OR_{OUT}$, such as the output signal Detect_Fixed_Pattern_CRC_Bypass, where the output signal Detect_Fixed_Pattern_CRC_Bypass can be taken as an example of the selection signal.

Assuming that K=128, when the sector size is equal to 512 bytes, it may take 32 cycles for the E2E bypass detection circuit 117F to read a sector within the any output data, where 128 bits may be regarded as 16 bytes, and (512/16)= 32. For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing access management of a memory device with aid of buffer usage reduction control, the method being applied to a controller of the memory device, the memory device comprising the controller and a non-volatile (NV) memory, the NV memory comprising at least one NV memory element, the method comprising:
   determining whether any host command among a plurality of host commands from a host device is a trim-related read command, wherein the trim-related read command represents a read command indicating that reading from at least one trimmed location is required;
   in response to the any host command being the trim-related read command, determining an estimated trim-related read operation count regarding a data buffer within the controller according to a trimmed range of the at least one trimmed location and a predetermined unit size of accessing the data buffer;
   writing predetermined trimmed data having the predetermined unit size into the data buffer, wherein the predetermined trimmed data carries a predetermined data pattern; and controlling a transmission interface circuit within the controller to read the predetermined trimmed data from the data buffer multiple times, for being returned to the host device, wherein a time count of the multiple times is equal to the estimated trim-related read operation count.

2. The method of claim 1, wherein the trim-related read command is a read trim command carrying a first logical address and a data length, and a combination of the first logical address and the data length indicates the trimmed range of the at least one trimmed location.

3. The method of claim 2, wherein a total size of the trimmed range is equal to the data length.

4. The method of claim 1, wherein the step of determining the estimated trim-related read operation count regarding the data buffer within the controller according to the trimmed range of the at least one trimmed location and the predetermined unit size of accessing the data buffer further comprises:
in response to the any host command being the trim-related read command, dividing a total size of the trimmed range by the predetermined unit size to determine the estimated trim-related read operation count.

5. The method of claim 1, wherein the predetermined data pattern represents any of an all-zero data pattern and an all-one data pattern.

6. The method of claim 1, wherein the step of controlling the transmission interface circuit within the controller to read the predetermined trimmed data from the data buffer the multiple times further comprises:
controlling the transmission interface circuit to read the predetermined trimmed data from the data buffer the multiple times, for returning combined trimmed data to the host device, wherein the combined trimmed data comprises the predetermined trimmed data and at least one copy of the predetermined trimmed data.

7. The method of claim 1, wherein in response to a trim command from the host device, no valid data exists at the at least one trimmed location.

8. The method of claim 1, wherein the at least one trimmed location represents at least one logical address at which no valid data exists; and the method further comprises:
maintaining a logical-to-physical (L2P) address mapping table for recording mapping relationships between logical addresses and physical addresses, wherein the at least one trimmed location is determined according to the L2P address mapping table.

9. The method of claim 8, wherein the trim-related read command carries trimmed range information indicating the trimmed range of the at least one trimmed location, and the trimmed range comprises at least one logical address; and at least one L2P table entry corresponding to the at least one logical address among multiple L2P table entries within the L2P address mapping table comprises predetermined information for indicating that no valid data exists at the at least one logical address.

10. The method of claim 9, wherein the trim-related read command is a read trim command carrying a first logical address and a data length, and the trimmed range information comprises the first logical address and the data length.

11. A memory device, comprising:
a non-volatile (NV) memory, configured to store information, wherein the NV memory comprises at least one NV memory elements; and
a controller, coupled to the NV memory, configured to control operations of the memory device, wherein the controller comprises:
a processing circuit, configured to control the controller according to a plurality of host commands from a host device, to allow the host device to access the NV memory through the controller;
a random access memory (RAM), configured to provide the controller with internal storage space; and
a transmission interface circuit, configured to perform communications with the host device according to a specific communications specification;
wherein:
the controller determines whether any host command among the plurality of host commands from the host device is a trim-related read command, wherein the trim-related read command represents a read command indicating that reading from at least one trimmed location is required;
in response to the any host command being the trim-related read command, the controller determines an estimated trim-related read operation count regarding a data buffer within the controller according to a trimmed range of the at least one trimmed location and a predetermined unit size of accessing the data buffer, wherein the data buffer is implemented with at least one storage region of the RAM;
the controller writes predetermined trimmed data having the predetermined unit size into the data buffer, wherein the predetermined trimmed data carries a predetermined data pattern; and
the controller controls the transmission interface circuit within the controller to read the predetermined trimmed data from the data buffer multiple times, for being returned to the host device, wherein a time count of the multiple times is equal to the estimated trim-related read operation count.

12. An electronic device comprising the memory device of claim 11, and further comprising:
the host device, coupled to the memory device, wherein the host device comprises:
at least one processor, arranged for controlling operations of the host device; and
a power supply circuit, coupled to the at least one processor, arranged for providing power to the at least one processor and the memory device;
wherein the memory device provides the host device with storage space.

13. A controller of a memory device, the memory device comprising the controller and a non-volatile (NV) memory, the NV memory comprising at least one NV memory element, the controller comprising:
a processing circuit, configured to control the controller according to a plurality of host commands from a host device, to allow the host device to access the NV memory through the controller;
a random access memory (RAM), configured to provide the controller with internal storage space; and
a transmission interface circuit, configured to perform communications with the host device according to a specific communications specification;
wherein:
the controller determines whether any host command among the plurality of host commands from the host device is a trim-related read command, wherein the trim-related read command represents a read command indicating that reading from at least one trimmed location is required;

in response to the any host command being the trim-related read command, the controller determines an estimated trim-related read operation count regarding a data buffer within the controller according to a trimmed range of the at least one trimmed location and a predetermined unit size of accessing the data buffer, wherein the data buffer is implemented with at least one storage region of the RAM;

the controller writes predetermined trimmed data having the predetermined unit size into the data buffer, wherein the predetermined trimmed data carries a predetermined data pattern; and the controller controls the transmission interface circuit within the controller to read the predetermined trimmed data from the data buffer multiple times, for being returned to the host device, wherein a time count of the multiple times is equal to the estimated trim-related read operation count.

* * * * *